United States Patent
Kim et al.

(10) Patent No.: US 10,642,777 B2
(45) Date of Patent: May 5, 2020

(54) SYSTEM AND METHOD FOR MAXIMIZING BANDWIDTH OF PCI EXPRESS PEER-TO-PEER (P2P) CONNECTION

(71) Applicant: SAMSUNG ELECTRONICS CO., LTD., Suwon-si, Gyeonggi-Do (KR)

(72) Inventors: Dong-Uk Kim, Seoul (KR); Han-Joon Kim, Hwaseong-si (KR); Jae-Hong Min, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/950,908

(22) Filed: Apr. 11, 2018

(65) Prior Publication Data
US 2019/0079895 A1 Mar. 14, 2019

(30) Foreign Application Priority Data
Sep. 8, 2017 (KR) .................. 10-2017-0115404

(51) Int. Cl.
*G06F 13/42* (2006.01)
*G06F 13/28* (2006.01)
*G06F 3/06* (2006.01)

(52) U.S. Cl.
CPC .......... *G06F 13/4282* (2013.01); *G06F 3/061* (2013.01); *G06F 3/0659* (2013.01); *G06F 3/0688* (2013.01); *G06F 13/28* (2013.01); *G06F 13/4278* (2013.01); *G06F 2213/0026* (2013.01)

(58) Field of Classification Search
CPC ............. G06F 13/42; G06F 13/28; G06F 3/06
USPC ........................................................ 710/308
See application file for complete search history.

(56) References Cited

U.S. PATENT DOCUMENTS

| | | | | |
|---|---|---|---|---|
| 5,889,760 A | * | 3/1999 | Yoshida | H04L 12/5601 370/395.2 |
| 5,987,479 A | * | 11/1999 | Oliver | G06F 3/0608 |
| 6,397,258 B1 | * | 5/2002 | Tsuji | H04L 47/19 709/233 |
| 7,526,593 B2 | | 4/2009 | Mandal et al. | |
| 7,660,925 B2 | | 2/2010 | Larson et al. | |

(Continued)

OTHER PUBLICATIONS

Suzuki J. et al, High-Throughput Direct Data Transfer between PCIe SSDs. 10th USENIX Conference on File and Storage Technologies, Feb. 15, 2012, pp. 1-2.

(Continued)

*Primary Examiner* — Christopher B Shin
(74) *Attorney, Agent, or Firm* — Volentine, Whitt & Francos, PLLC

(57) ABSTRACT

A method and system for maximizing bandwidth of a Peripheral Component Interconnect Express (PCIe) Peer-to-Peer (P2P) connection determine a maximum bandwidth and a maximum read request size of a first device, determining a maximum bandwidth and a minimum payload size of a second device, calculate a calculated maximum payload size of the second device by using the maximum read request size of the first device and a bandwidth ratio between the first device and the second device, compare the minimum payload size of the second device with the calculated maximum payload size, and set an operational payload size of the second device to the calculated maximum payload size when the calculated maximum payload size is equal to or greater than the minimum payload size.

20 Claims, 14 Drawing Sheets

(56) References Cited

U.S. PATENT DOCUMENTS

| | | | |
|---|---|---|---|
| 7,796,519 B2* | 9/2010 | Yoshihara | H04J 3/1694 370/236 |
| 9,684,461 B1* | 6/2017 | Dodson | G06F 3/0613 |
| 2004/0194095 A1* | 9/2004 | Lumb | G06F 9/4887 718/100 |
| 2006/0056300 A1* | 3/2006 | Tamura | 370/235 |
| 2008/0034147 A1 | 2/2008 | Stubbs et al. | |
| 2008/0263307 A1 | 10/2008 | Adachi | |
| 2010/0189129 A1* | 7/2010 | Hinosugi | H04L 47/10 370/468 |
| 2011/0185103 A1 | 7/2011 | Evoy et al. | |
| 2011/0246686 A1 | 10/2011 | Cavanagh, Jr. et al. | |
| 2013/0326515 A1* | 12/2013 | Hara | G06F 9/455 718/1 |
| 2014/0129741 A1 | 5/2014 | Shahar et al. | |
| 2014/0351780 A1 | 11/2014 | Keckler et al. | |
| 2016/0092117 A1* | 3/2016 | Ramalingam | G06F 3/0613 711/103 |
| 2016/0364167 A1* | 12/2016 | Makida | G06F 3/061 |
| 2017/0060800 A1 | 3/2017 | Watkins et al. | |
| 2018/0307521 A1* | 10/2018 | Pinto | G06F 9/45558 |
| 2019/0079895 A1* | 3/2019 | Kim | G06F 13/4278 |

OTHER PUBLICATIONS

Huang J. et al, FlashBlox: Achieving Both Performance isolation and Uniform Lifetime for Virtualized SSDs. 15th USENIX Conference on File and Storage Technologies, Mar. 2, 2017, pp. 317-390, p. 377.

Office Action From Intellectual Property Office of Singapore dated November 19, 2018 Cited in Related Singapore Patent Applicarion No. 102501805213R.

Office Action dated Oct. 15, 2019 From Intellectual Property Office of Singapore in Related Patent Application No. 10201805213R.

* cited by examiner

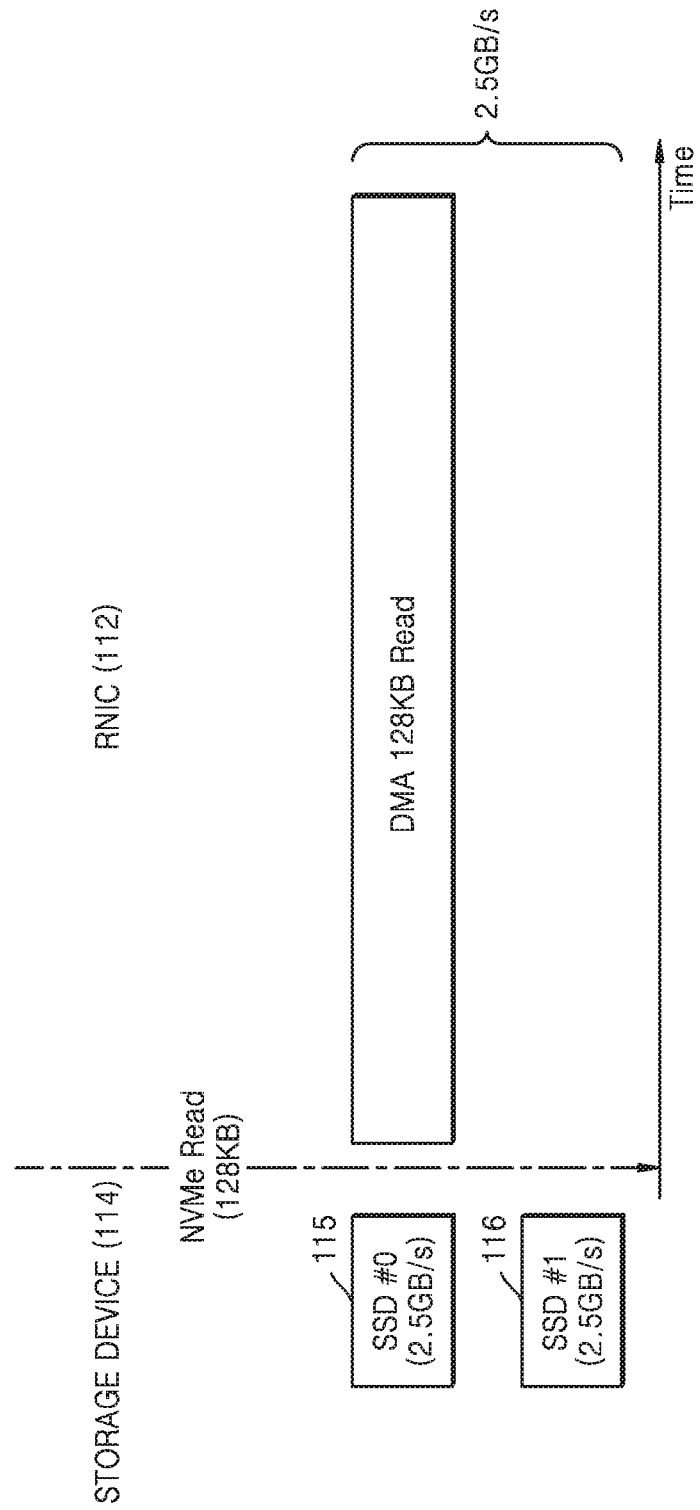

− Without REQUEST MANAGER −

− With REQUEST MANAGER −

SYSTEM AND METHOD FOR MAXIMIZING BANDWIDTH OF PCI EXPRESS PEER-TO-PEER (P2P) CONNECTION

CROSS-REFERENCE TO RELATED APPLICATION

This application claims the benefit of Korean Patent Application No. 10-2017-0115404, filed on Sep. 8, 2017, in the Korean Intellectual Property Office, the disclosure of which is incorporated herein in its entirety by reference.

BACKGROUND

The inventive concept relates to a data processing system, and more particularly, to a method and system for performing data transfer between Peripheral Component Interconnect Express (PCIe) Peer-to-Peer (P2P) connected devices with maximum bandwidth.

Solid State Drives (SSDs) are high performance and high speed storage devices. Nonvolatile Memory Express (NVMe), which is a high-speed data transmission standard optimized for accessing SSDs, has been, and is currently, used. NVMe provides direct input/output (I/O) access to storage devices (or nonvolatile memories) mounted on a PCIe interface. However, in the case of mass storage on a particular storage device, use of NVMe may reduce the PCIe bandwidth.

SUMMARY

The inventive concept provides a method of maximizing bandwidth of a Peripheral Component Interconnect Express (PCIe) Peer-to-Peer (P2P) connection.

The inventive concept also provides a data processing system for maximizing bandwidth of a PCIe P2P connection.

According to an aspect of the inventive concept, there is provided a method of maximizing a data transfer bandwidth between Peripheral Component Interconnect Express (PCIe) peer-to-peer (P2P) connected devices, the method including: determining a maximum bandwidth and a maximum read request size of a first device; determining a maximum bandwidth of a second device; calculating a first maximum payload size of the second device, based on the maximum read request size of the first device, the maximum bandwidth of the first device, and the maximum bandwidth of the second device; and setting a payload size of the second device, based on the calculated first maximum payload size.

According to another aspect of the inventive concept, there is provided a data processing system including: an interface device configured to respond to requests issued by a host; and a storage device including a plurality of storage elements accessed by the host, wherein the interface device or each of the plurality of storage elements is configured to calculate a maximum payload size of the storage element based on a maximum read request size of the interface device, a maximum bandwidth of the interface device, and a maximum bandwidth of the storage element, and set a payload size of the storage element based on the calculated maximum payload size.

According to another aspect of the inventive concept, there is provided a computer program product including a non-transitory computer-readable recording medium having computer-readable program codes embodied thereon for maximizing a data transfer bandwidth between Peripheral Component Interconnect Express (PCIe) peer-to-peer (P2P) connected devices, the computer program product including: a program code configured to determine a maximum bandwidth and a maximum read request size of a first device and determine a maximum bandwidth and a minimum payload size of a second device; a program code configured to calculate a maximum payload size of the second device by using the maximum read request size of the first device and a bandwidth ratio between the first device and the second device; a program code configured to compare the minimum payload size of the second device with the calculated maximum payload size; and a program code configured to set a payload size of the second device to the calculated maximum payload size when the calculated maximum payload size is equal to or greater than the minimum payload size, and to set the payload size of the second device to the minimum payload size when the calculated maximum payload size is less than the minimum payload size.

According to yet another aspect of the inventive concept, there is provided a system, comprising a first Peripheral Component Interconnect Express (PCIe) peer-to-peer (P2P) connected device, and a second PCIe P2P connected device, wherein the first PCIe P2P connected device and the second PCIe P2P connected device are connected to each other, wherein one of the first PCIe P2P connected device and the second PCIe P2P connected device includes a request manager, The request manager is configured to: determine a maximum bandwidth and a maximum read request size of the first PCIe P2P connected device; determine a maximum bandwidth of the second PCIe P2P connected device; determine a calculated maximum payload size of the second PCIe P2P connected device, based on the maximum read request size of the first PCIe P2P connected device, the maximum bandwidth of the first PCIe P2P connected device, and the maximum bandwidth of the second PCIe P2P connected device; compare a minimum payload size of the second PCIe P2P connected device with the calculated maximum payload size of the second PCIe P2P connected device; and set an operational payload size of the second PCIe P2P connected device for data transfers involving the second PCIe P2P connected device based on a result of the comparison. The request manager is further configured such that when the calculated maximum payload size of the second PCIe P2P connected device is greater than or equal to the minimum payload size of the second PCIe P2P connected device, the request manager sets the operational payload size of the second device to the calculated maximum payload size of the second device, and when the calculated maximum payload size of the second PCIe P2P connected device is less than the minimum payload size of the second PCIe P2P connected device, the request manager sets the operational payload size of the second device to the minimum payload size of the second PCIe P2P connected device.

BRIEF DESCRIPTION OF THE DRAWINGS

Embodiments of the inventive concept will be more clearly understood from the following detailed description taken in conjunction with the accompanying drawings.

FIGS. 4A and 4B are diagrams illustrating data transfer according to an RDMA Read message, performed in the RNIC of FIG. 1.

DETAILED DESCRIPTION OF THE EMBODIMENTS

Figure 1:
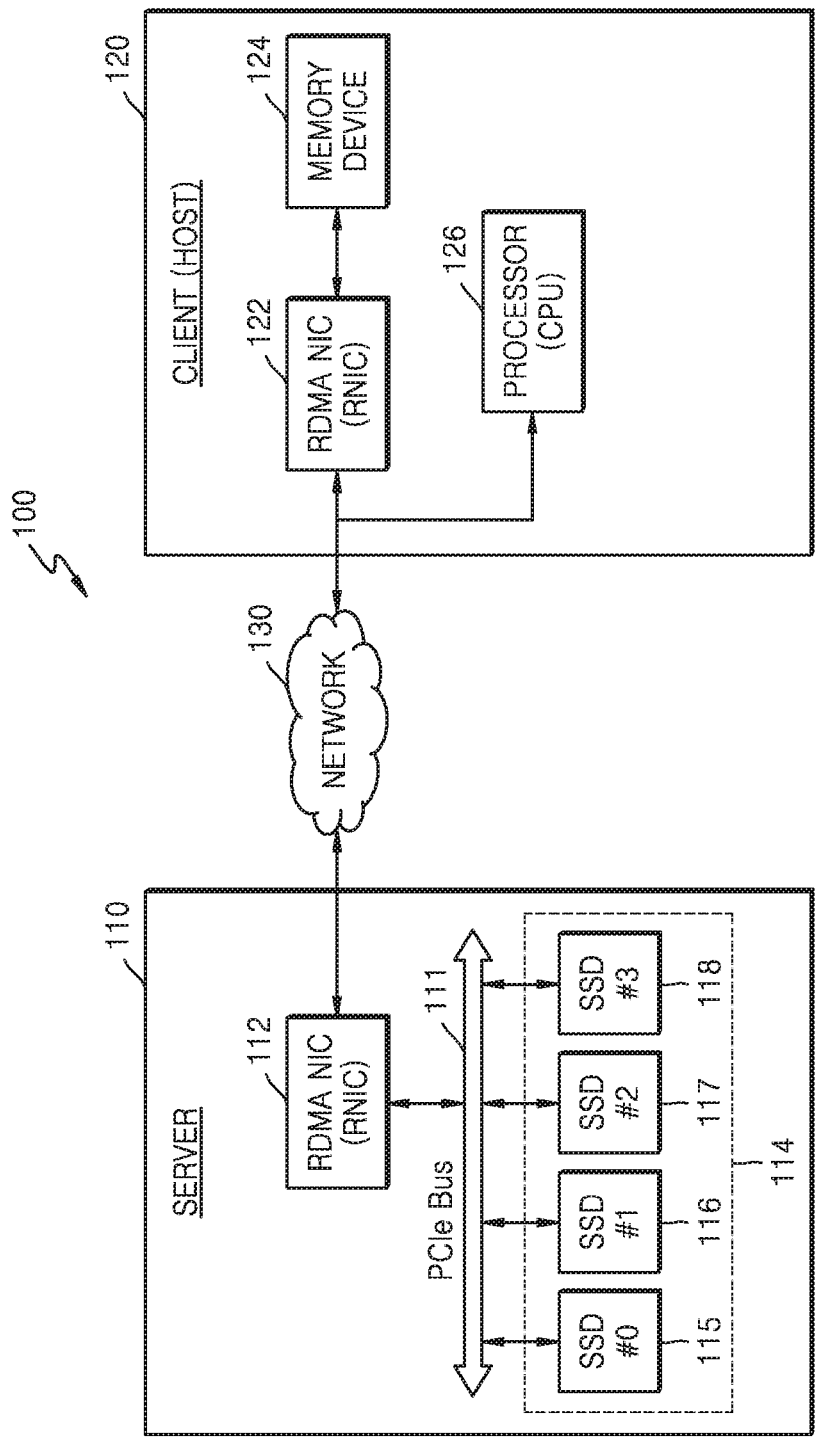
FIG. 1 illustrates a data processing system suitable for using a Remote Direct Memory Access (RDMA)-enabled Network Interface Controller (RNIC).

FIG. 1 illustrates a data processing system 100 suitable for using a Remote Direct Memory Access (RDMA)-enabled Network Interface Controller (RNIC).

Referring to FIG. 1, data processing system 100 includes peers 110 and 120 that may communicate with each other by using an RDMA protocol. Peers 110 and 120 may be storage systems or computer systems capable of transmitting or receiving data over a network 130. Peers 110 and 120 are provided by way of example, and RDMA connections may be between multiple clients, multiple servers, server farms, server clusters, application servers, or message servers.

Peers 110 and 120 are shown in FIG. 1 as a server 110 and a client 120. Server 110 denotes a peer that receives a request from client 120 through network 130 and performs a service and transmits a result to client 120, and client 120 denotes a peer that makes a request to server 110 and waits for a response. Client 120 may be referred to as a host.

RDMA performs data transfer from one memory to a memory of another apparatus or system. This data transfer enables Direct Memory Access (DMA) through network 130 without a Central Processing Unit (CPU or processor) or operating system intervention, thereby enabling high throughput, low latency and low overhead data transfer.

Network 130 is shown as a separate single network, but may be any type of network that is generally understood by those skilled in the art. Network 130 may be a personal or public network, wired or wireless network, or full or partial network. According to an embodiment, network 130 may be a global network such as the Internet or the World Wide Web ("Web"), a Wide Area Network (WAN), or a Local Area Network (LAN).

Server 110 may include an RNIC 112 and a storage device 114, both connected to a Peripheral Component Interconnect Express (PCIe) bus 111. RNIC 112 may be a network interface controller that supports network interface cards, network adapters, and/or RDMA. Storage device 114 connected to RNIC 112 may be implemented with a Nonvolatile Memory Express (NVMe) storage protocol using RDMA. The NVMe storage protocol may include, for example, one selected from among an Internet Wide Area RDMA protocol (iWARP), an Infiniband protocol, or an RDMA over Converged Ethernet (RoCE) protocol. Storage device 114 may include a plurality of storage elements 115 to 118 and the storage elements 115 to 118 may include NVMe SSDs or PCIe SSDs. Storage device 114 may be implemented with NVMe-over Fabrics (NVMe-oF).

NVMe is a scalable host controller interface designed to handle the needs of an enterprise, a data center and client systems, which are capable of using SSDs. NVMe is used as an SSD device interface for presenting a storage entity interface to a host.

PCIe is a high-speed serial computer expansion bus standard designed to replace PCI, PCI-X, and Accelerated Graphics Port (AGP) bus standards. The PCIe standard includes higher maximum system bus throughput, lower I/O pin count and smaller physical footprint, better performance-scaling for bus devices, and more detailed error detection and reporting mechanisms.

The NVMe standard is positioned to define optimized register interfaces, command sets, and feature sets for PCIe SSDs and take advantage of the functionality of PCIe SSDs and standardize PCIe SSD interfaces. The NVMe-oF is a PCIe NVMe SSD-based flash storage array and may be extended to a fabric that may communicate in a massively parallel way.

Client 120 may include an RNIC 122, a memory 124 and a processor (or CPU) 126. Memory 124 may include a system memory, a main memory, a volatile memory, and a non-volatile memory. Memory 124 may be a volatile or nonvolatile, and removable or non-removable, computer storage medium implemented in any method or technology for storage of information such as computer readable instructions, data structures, program modules or other data. The computer storage medium may include RAM, ROM, EEPROM, a flash memory or other memory technology-based memory, CD-ROM, DVD or other optical storage, magnetic cassette, magnetic tape, magnetic disk storage or other magnetic storage, or any other medium that may be used to store desired information and may be accessed by a computer system. However, the computer storage medium is not limited thereto.

Processor 126 may control the overall operation of data processing system 100. Processor 126 may include a plurality of processing cores, and each of the processing cores may include a plurality of processing entries. Processor 126 may command an operation of writing or reading data to or from storage device 114 of server 110 according to the processing entries. For example, processor 126 may send a command to initiate data transfer to server 110 via network 130.

RNIC 122 may be a network interface controller that supports a network interface card similar to RNIC 112 of server 110, a network adapter, and/or RDMA. RNICs 112 and 122 may support an RDMA protocol.

RNICs 112 and 122 may support an RDMA protocol that allows direct transfer of data from storage device 114 to memory 124 and vice versa. Such data transfer does not require or include supervision of processor 126. Accordingly, the RDMA protocol has advantages of high bandwidth, low latency and low overhead.

The RDMA protocol defines RDMA messages, i.e., "Send", "Write", and "Read", for data transfer. RNICs 112 and 122 may perform a management operation for allocating and deallocating RNIC resources and an operation for posting a work request (WR). The management operation of RNICs 112 and 122 may include Queue Pair (QP) allocation and deallocation, Completion Queue (CQ) allocation and deallocation, or memory allocation and deallocation. Hereinafter, for convenience of explanation, the function of RNIC 112 will be described in detail. The function of RNIC 112 may be the same as a function of RNIC 122.

RNIC 112 may allocate a QP to which WRs are posted. The QP may include a pair of work queues (e.g., transmit and receive), and a posting mechanism for each queue. RNIC 112 may post WRs to work queues to execute posted WRs. Each of the work queues is a list of Work Queue Elements (WQEs). Each of the WQEs may hold some control information describing a work request and may refer to (or point to) buffers of RNIC 112.

The information that may be held by the WQE may be a description of buffers that transfer data for transmitting or representing a WR type and a location for receive data. The WR type may be classified into a Send WR, which may be "RDMA Send", "RDMA Write", "RDMA Read", etc., and a Receive WR, which may be "RDMA Receive". The WQE is described with or corresponds to a single RDMA message. When posting a Send WR of an RDMA Write type, RNIC 112 may construct, in a Send Queue (SQ), a WQE describing buffers in which data has to be taken by using an RDMA Write message and then has to be sent to a responder (e.g., storage device 114). As another example, when posting a Receive WR, RNIC 112 may add a WQE to a Receive Queue (RQ) holding a buffer to be used to place a payload of a received Send message.

RNIC 112 may be informed of a doorbell ring operation whenever the WQE is added to the SQ or the RQ. The doorbell ring operation is a write to a memory space of RNIC 112 which is detected and decoded by hardware of RNIC 112. Thus, a doorbell ring notifies RNIC 112 that there is a new task that needs to be performed for a specified SQ/RQ.

RNIC 112 may transfer data to the plurality of storage elements 115 to 118 in storage device 114 connected via PCIe bus 111 in response to requests issued from client 120.

In order to maximize a data transfer bandwidth between RNIC 112 and storage elements 115 to 118, RNIC 112 may determine a Maximum Read Request Size (MRRS) and a maximum bandwidth ($BW_{RNIC}$) of RNIC 112 and a maximum bandwidth ($BW_{SSD}$) and a minimum payload size of each of storage elements 115 to 118. RNIC 112 may perform an operation of multiplying the MRRS of RNIC 112 by a bandwidth ratio ($BW_{SSD}/BW_{RNIC}$) of each of storage elements 115 to 118 to calculate a maximum payload size of each of storage elements 115 to 118, and may compare the calculated maximum payload size of each of storage elements 115 to 118 with a minimum payload size. When the calculated maximum payload size of each of storage elements 115 to 118 is greater than or equal to the minimum payload size, RNIC 112 may set a payload size of each of storage elements 115 to 118 to the calculated maximum payload size. When the calculated maximum payload size of each of storage elements 115 to 118 is less than the minimum payload size, RNIC 112 may set a payload size of each of storage elements 115 to 118 to the minimum payload size.

According to an embodiment, in order to maximize a data transfer bandwidth between RNIC 112 and storage elements 115 to 118, each of storage elements 115 to 118 may determine the MRRS and a maximum bandwidth ($BW_{RNIC}$) of RNIC 112 and the maximum bandwidth ($BW_{SSD}$) and the minimum payload size of each of storage elements 115 to 118. Each of storage elements 115 to 118 may perform an operation of multiplying the MRRS of RNIC 112 by a bandwidth ratio ($BW_{SSD}/BW_{RNIC}$) of each of storage elements 115 to 18 to calculate the maximum payload size of each of storage elements 115 to 118, and may compare the calculated maximum payload size of each of storage elements 115 to 118 with the minimum payload size. When the calculated maximum payload size of each of storage elements 115 to 118 is greater than or equal to the minimum payload size, each of storage elements 115 to 118 may set a payload size of each of storage elements 115 to 118 to the calculated maximum payload size. When the calculated maximum payload size of each of storage elements 115 to 118 is less than the minimum payload size, each of storage elements 115 to 118 may set a payload size of each of storage elements 115 to 118 to the minimum payload size.

Figure 2:
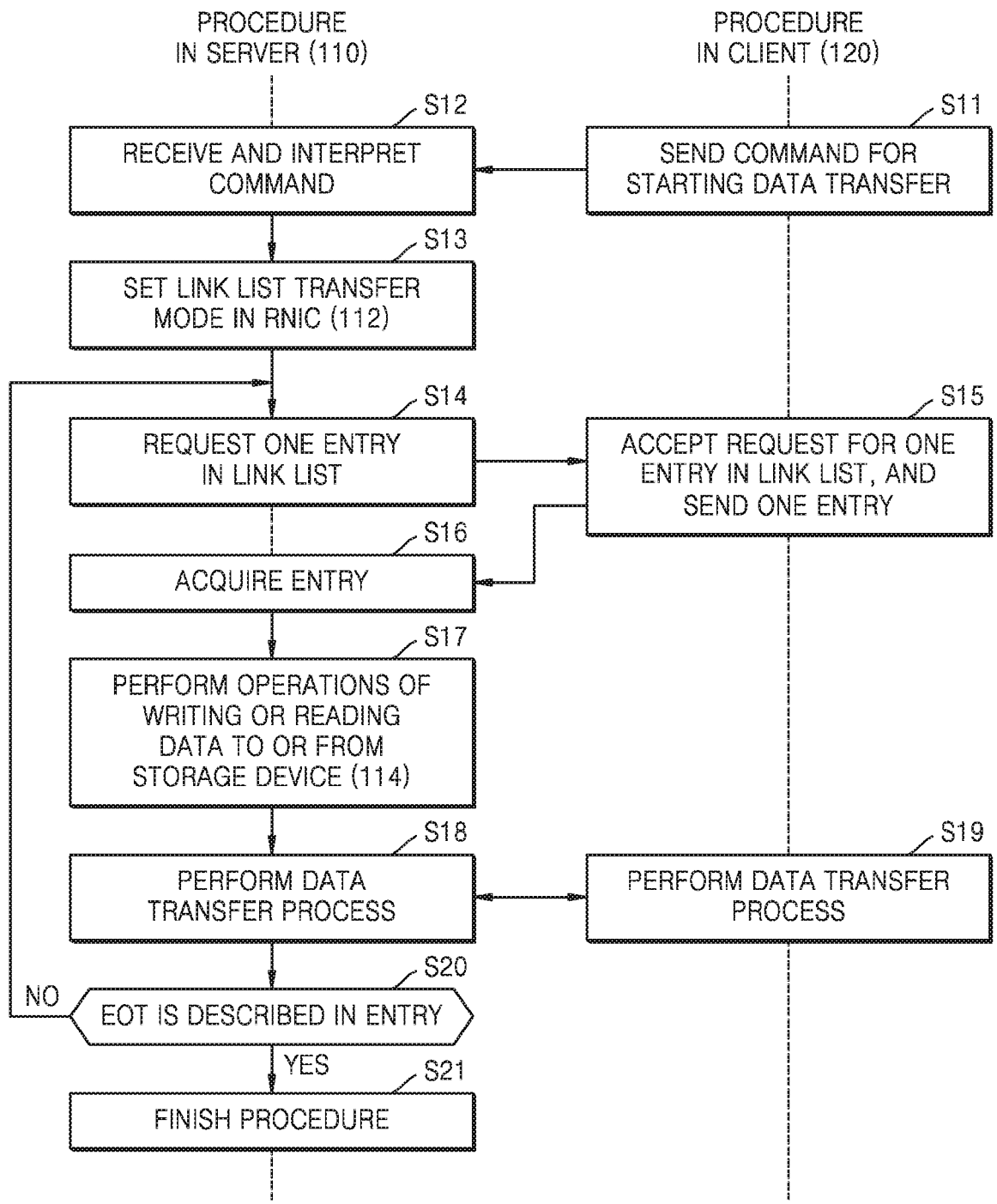
FIG. 2 is a flowchart illustrating an operation of the data processing system of FIG. 1.

FIG. 2 is a flowchart illustrating an exemplary operation of the data processing system of FIG. 1.

Referring to FIG. 2, in Operation S11, processor 126 of client 120 may send a command for starting data transfer to server 110 via network 130.

In Operation S12, server 110 may receive the command via network 130, and the received command may be interpreted as a command relating to data transfer.

In Operation S13, server 110 may set RNIC 112 to a link list transfer mode.

In Operation S14, RNIC 112 set to the link list transfer mode may request one entry in a link list from client 120 via network 130.

In Operation S15, client 120 may accept a request for one entry in the link list and send one entry in the link list to server 110 via network 130. One entry in the link list, sent to server 110, may be a WR indicating an RDMA message.

In Operation S16, server 110 may acquire a WR of the entry and post the acquired WR to RNIC 112.

In Operation S17, RNIC 112 of server 110 may perform an operation of writing or reading data to or from storage device 114 in accordance with the posted WR. For example, RNIC 112 may read a data payload transmitted from storage device 114 and control read data to be directly arranged and packetized. The handling of data transfer in RNIC 112 will be described in detail in FIG. 3.

In Operations S18 and S19, server 110 and client 120 may perform a data transfer process.

In Operation S20, RNIC 112 of server 110 may determine whether or not an end of transmission (EOT) is described in the entry acquired in Operation S16. If it is determined in Operation S20 that the EOT is not described, the process may move to Operation S14 to repeat subsequent operations.

If it is determined in Operation S20 that the EOT is described, an operation between server 110 and client 120 ends in Operation S21.

Figure 3:
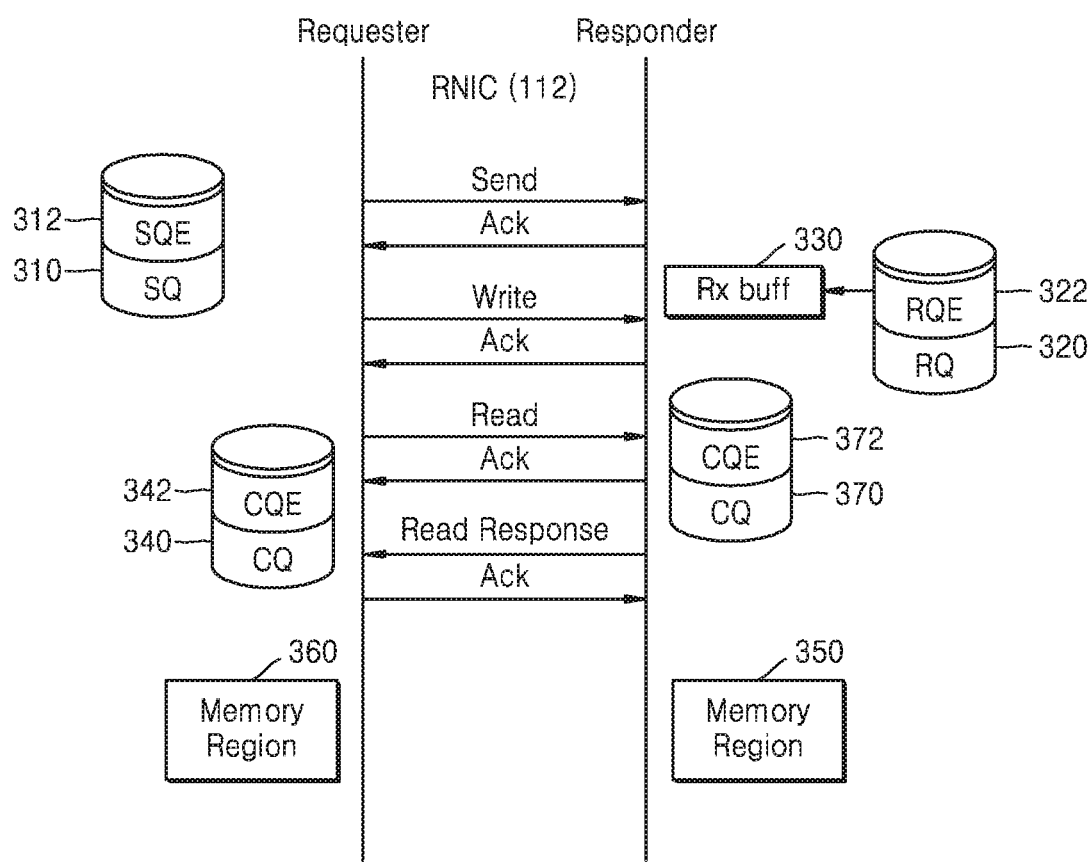
FIG. 3 is a diagram illustrating handling for RDMA message data transfers performed in the RNIC of FIG. 1.

FIG. 3 is a diagram illustrating handling for RDMA message data transfers performed in RNIC 112 of FIG. 1. FIG. 3 illustrates an environment of an operation of RNIC 112 performed in Operation S17 illustrated in FIG. 2.

Referring to FIG. 3, RNIC 112 may choose to serve a specific SQ. For purposes of this description, an entity that initiates data transfer will be referred to herein as a "requester", and an entity that responds to data transfer will be referred to herein as a "responder". Similarly, an entity that transfers data may be referred to as a "transmitter", and an entity that receives data may be referred to as a "receiver".

A requester of RNIC 112 may read a Send Queue Element (SQE) 312 from an SQ 310. SQE 312 indicates a WQE posted to SQ 310. When SQE 312 corresponds to an RDMA Send request, RNIC 112 may generate a Send message and send the Send message to a responder of RNIC 112. When the responder of RNIC 112 receives the Send message, RNIC 112 may read a Receive Queue Element (RQE) 322 from an RQ 320 and arrange a payload of the received message in buffers 330 (responder Rx buffer) that is referred to by RQE 322. RQE 322 indicates a WQE posted to RQ 320.

The requester of RNIC 112 may post a Send WR of an RDMA Write or RDMA Read type when the requester of RNIC 112 wants to access a memory region 350 of responder of the RNIC 112. The requester of RNIC 112 may add SQEs 312 corresponding to RDMA Write or RDMA Read to SQ 310 and notify RNIC 112. RNIC 112 may read SQE 312 from SQ 310 and generate an RDMA Write message or an RDMA Read message.

The RDMA Write message may be received by RNIC 112, and RNIC 112 may locate memory region 350 by using Direct Data Placement (DDP) segments in the RDMA Write message and arrange a payload of the RDMA Write message in memory region 350.

When the RDMA Read message is received at RNIC 112, RNIC 112 may generate an RDMA Read Response message and may send the RDMA Read Response message to the requester of RNIC 112. In this case, RQ 320 may be referred to as a read queue. When the RDMA Read Response message is received, RNIC 112 may handle the RDMA Read Response message similar to the handling of the RDMA Write message. That is, a payload of the RDMA Read Response message may be arranged in memory region 360 of the requester of RNIC 112.

In FIG. 3, in addition to handling WRs, RNIC 112 may notify completion of WRs. Completion notification is made by using CQ 340 assigned through a dedicated function provided by RNIC 112. CQ 340 includes a Completion Queue Element (CQE) 342. CQE 342 is arranged in CQ 340 by RNIC 112 when RNIC 112 reports the completion of a WR. Each work queue, i.e., SQ 310 or RQ 320, has a CQ 340 associated therewith. The association is performed at the time of QP allocation.

When posting a WR to SQ 310, RNIC 112 may specify whether or not RNIC 112 desires to be notified when the WR is completed. When completion notification is requested, RNIC 112 may arrange CQE 342 in CQ 340 associated with SQ 310 upon the completion of the WR. RDMA Send WR and RDMA Write WR are completed when the RDMA Send WR and the RDMA Write WR are safely transmitted. The RDMA Read WR is completed when an RDMA Read Response message corresponding thereto is received and arranged in memory region 360. WRs are completed in the order posted in SQ 310. Each WR posted to RQ 320 also requires completion notification. Accordingly, when the arrangement of a received Send message is finished, RNIC 112 arranges CQE 342 in CQ 340 associated with RQ 320.

Figure 4A:
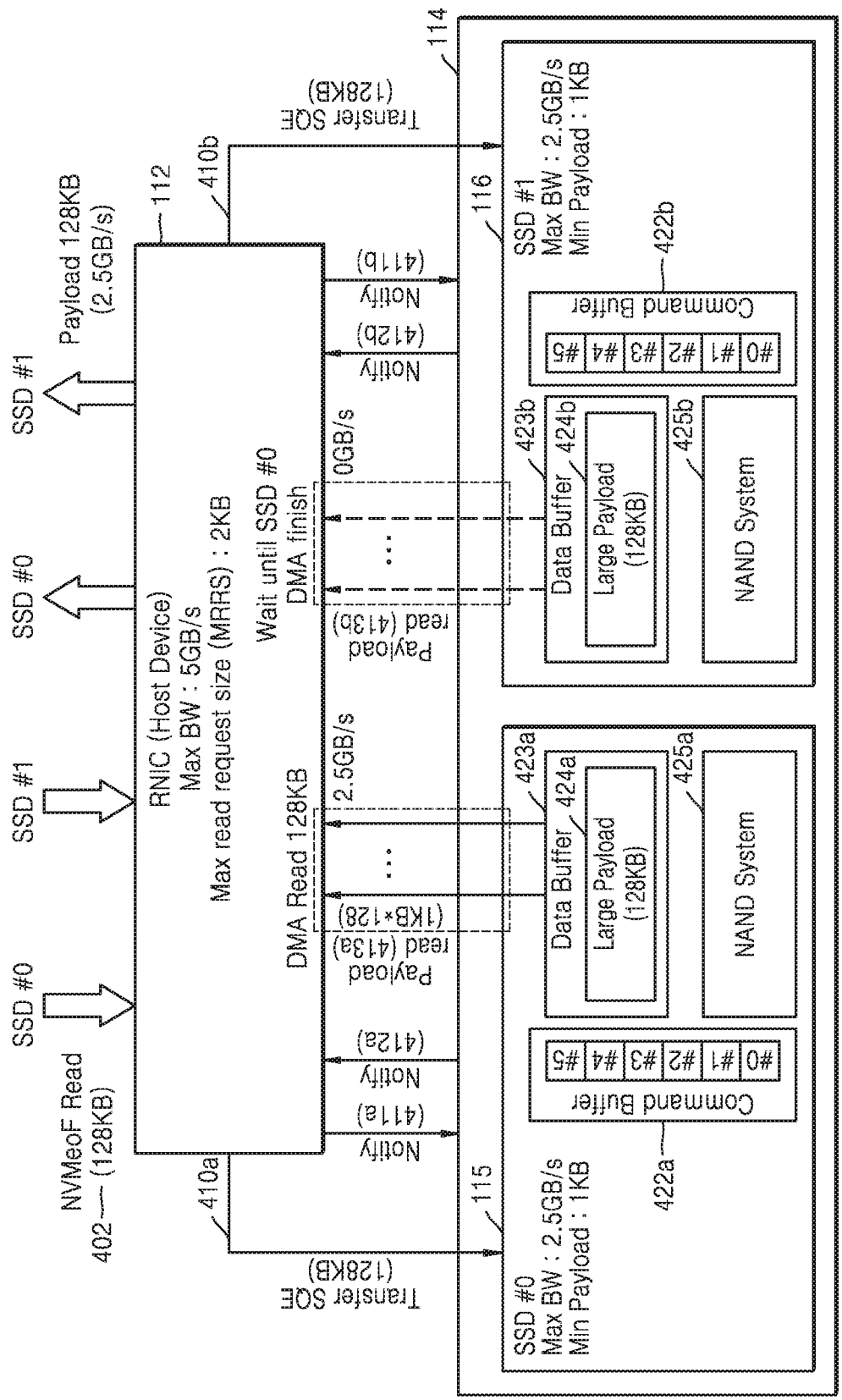

FIGS. 4A and 4B are diagrams illustrating data transfer according to an RDMA Read message, performed in RNIC 112 of FIG. 1. RNIC 112 may distribute data transfer to the plurality of storage elements 115 to 118 (see FIG. 1) in storage device 114, i.e., an NVMe-oF storage device, during data transfer according to an RDMA Read message, and FIGS. 4A and 4B illustrate, for example, a case where data is transferred by focusing on one storage element 115. In FIG. 4A, for convenience of description, two of the plurality of storage elements 115 to 118 in storage device 114, for example, storage elements 115 and 116 (hereinafter, referred to as first and second SSDs 115 and 116, or SSD #0 and SSD #1, respectively), are mainly illustrated. FIG. 4A illustrates data transfer using an NVMe-oF Read work request (WR) of RNIC 112. The NVMe-oF Read WR may correspond to a WR of an RDMA Read type, described with reference to FIG. 3.

Referring to FIG. 4A, RNIC 112 may receive an NVMe-oF Read WR (Operation 402), post the NVMe-oF Read WR to SQ 310 (see FIG. 3) as an SQE 312 (see FIG. 3) and then read the NVMe-oF Read WR posted to SQ 310, and transfer a Read message of SQE 312 to first and second SSDs 115 and 116 of storage device 114 (Operations 410a and 410b).

RNIC 112 may complete the Read message transfer to first and second SSDs 115 and 116 of storage device 114 and notify first and second SSDs 115 and 116 (Operations 411a and 411b).

First and second SSDs 115 and 116 may write command entries #0 to #5 in command buffers 422a and 422b, respectively, in accordance with a command format of the received Read message. First and second SSDs 115 and 116 may read data from NAND systems 425a and 425b, respectively, according to the command entries #0 to #5 and store the read data in data buffers 423a and 423b, respectively. First and second SSDs 115 and 116 may store the read data of NAND systems 425a and 425b in data buffers 423a and 423b, respectively, and then notify RNIC 112 (Operations 412a and 412b).

RNIC 112 may read data in data buffers 423a and 423b of first and second SSDs 115 and 116, respectively. The data in data buffers 423a and 423b is data read from NAND system 425a and NAND system 425b including NAND flash memory cells and includes data packets in which payloads 424a and 424b are loaded. As such, since first and second SSDs 115 and 116 may operate independently according to an NVMe-oF protocol, there is an advantage in that an offloading is possible.

However, when MRRS of RNIC 112 is less than the payload size of data buffers 423a and 423b, the operations of first and second SSDs 115 and 116 may be focused on one SSD without being distributed. As an example, it is assumed that RNIC 112 has an MRRS of 2 kilobyte (KB) and a maximum bandwidth of 5 gigabyte/second (GB/s), and it is assumed that each of first and second SSDs 115 and 116 has a minimum payload size of 1 KB and a maximum bandwidth of 2.5 GB/s. Also, it is assumed that the size of a payload loaded in data buffers 423a and 423b of first and second SSDs 115 and 116 is 128 KB.

RNIC 112 may process an NVMe-oF Read WR for first and second SSDs 115 and 116. If RNIC 112 is in the process of processing an NVMe-oF Read WR of first SSD 115 first, RNIC 112 may read payload 424a of data buffer 423a of first SSD 115 by using DMA transfer processing and then read payload 424b of data buffer 423b of second SSD 116. An operation (Operation 413a) of reading payload 424a of 128 KB in data buffer 423a of first SSD 115 will be performed 128 times with a minimum payload size of 1 KB. During the read operation (Operation 413a) for first SSD 115, RNIC 112 may not perform a read operation (Operation 413b) on payload 424b of data buffer 423b of second SSD 116. RNIC 112 may be focused on first SSD 115, as shown in FIG. 4B. The read operation (Operation 413b) for payload 424b of data buffer 423b of second SSD 116 may be performed after waiting for the completion of DMA transfer processing for first SSD 115.

In FIG. 4B, RNIC 112 has a maximum performance that a read operation may be performed with a 5 GB/s bandwidth. However, the maximum performance of RNIC 112 may be limited to a 2.5 Gb/s bandwidth of first SSD 115 while RNIC 112 performs an NVMe-oF Read WR of focused first SSD 115. That is, there is a problem in which the maximum performance of RNIC 112 is limited to a DMA transfer bandwidth of one SSD (e.g., first SSD 115).

Figure 5:
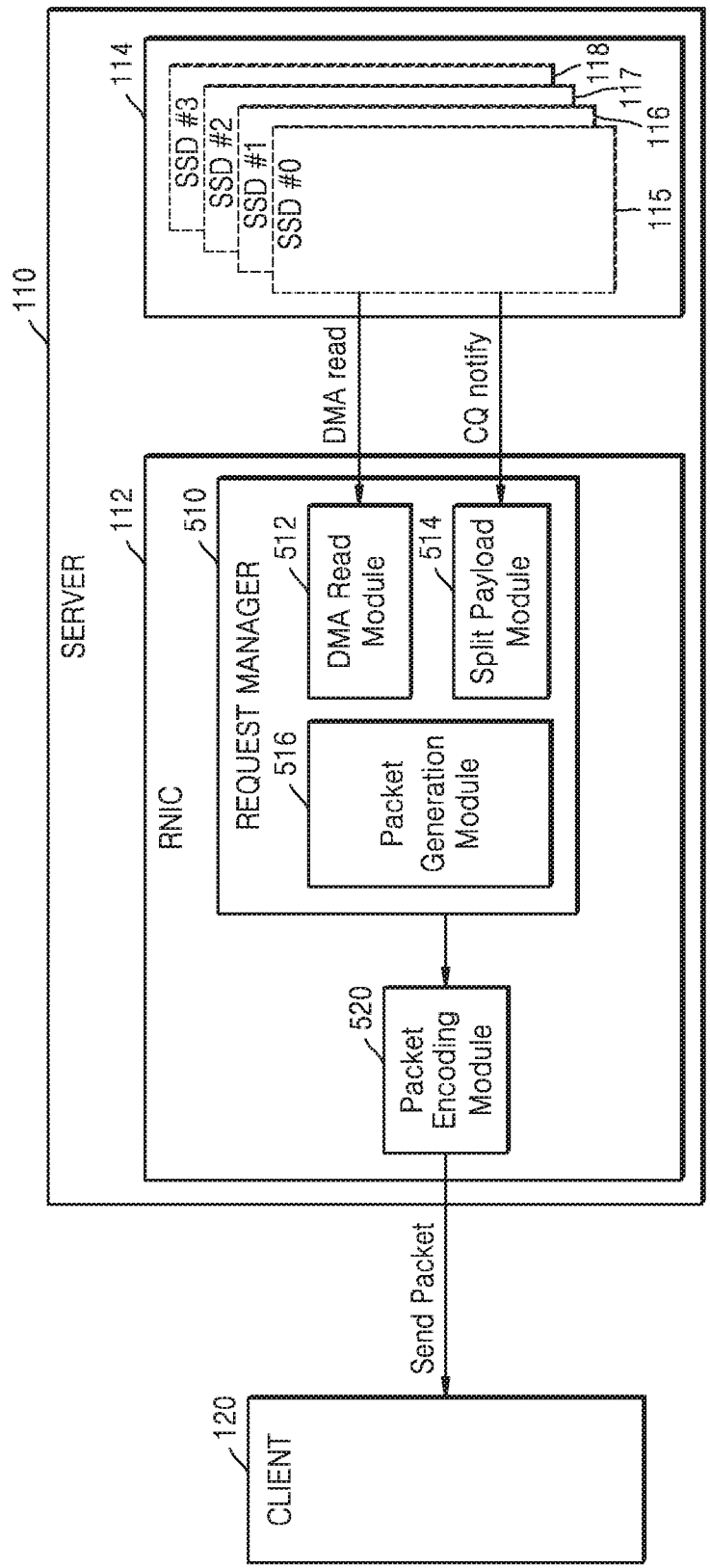
FIG. 5 is a diagram illustrating an exemplary embodiment of an RNIC operating so that a bandwidth of a PCIe P2P connection has a maximum bandwidth.

FIG. 5 is a diagram illustrating an exemplary embodiment of an RNIC operating so that a bandwidth of a PCIe P2P connection has a maximum bandwidth. Referring to FIG. 5, an RNIC 112 includes a request manager 510 for allowing RNIC 112 to operate at a maximum bandwidth in order to solve the problem in which the bandwidth of RNIC 112 described with reference to FIGS. 4A and 4B is limited, without increasing hardware complexity.

Request manager 510 may include a DMA read module 512, a split payload module 514, and a packet generation module 516. DMA read module 512 may receive data transferred from first to fourth SSDs 115 to 118 of storage device 114.

Split payload module 514 may determine the maximum bandwidth ($BW_{RNIC}$) and MRRS of RNIC 112. Split payload module 514 may determine the maximum band width ($BW_{SSD}$) and minimum payload size of each of first to fourth SSDs 115 to 118. Split payload module 514 may calculate a bandwidth ratio ($BW_{SSD}/BW_{RNIC}$) between the maximum bandwidth ($BW_{SSD}$) of each of first to fourth SSDs 115 to 118 and the maximum bandwidth ($BW_{RNIC}$) of RNIC 112.

Split payload module 514 may calculate a maximum payload size of each of first to fourth SSDs 115 to 118 by using the MRRS of RNIC 112 and the bandwidth ratio ($BW_{SSD}/BW_{RNIC}$) between the maximum bandwidth ($BW_{SSD}$) of each of first to fourth SSDs 115 to 118 and the maximum bandwidth ($BW_{RNIC}$) of RNIC 112.

Split payload module 514 may perform an operation of dividing the maximum bandwidth ($BW_{SSD}$) of each of first to fourth SSDs 115 to 118 by the maximum bandwidth ($BW_{RNIC}$) of RNIC 112 to obtain the bandwidth ratio ($BW_{SSD}/BW_{RNIC}$).

Split payload module 514 may perform an operation of multiplying the MRRS of RNIC 112 by the bandwidth ratio ($BW_{SSD}/BW_{RNIC}$) for each of first to fourth SSDs 115 to 118 to calculate a calculated maximum payload size of each of first to fourth SSDs 115 to 118.

Split payload module 514 may compare the minimum payload size of each of first to fourth SSDs 115 to 118 with the calculated maximum payload size of each of first to fourth SSDs 115 to 118.

Split payload module 514 may set the operational payload size of each of first to fourth SSDs 115 to 118 to the calculated maximum payload size when the calculated maximum payload size of each of first to fourth SSDs 115 to 118 is equal to or greater than the minimum payload size. Here, the operational payload size refers to the actual payload size which is used in operation for data transfers involving each of the first to fourth SSDs 115 to 118.

Split payload module 514 may set the operational payload size of each of first to fourth SSDs 115 to 118 to the minimum payload size when the calculated maximum payload size of each of first to fourth SSDs 115 to 118 is less than the minimum payload size.

Each of first to fourth SSDs 115 to 118 may generate command entries according to a WR of RNIC 112. Each of first to fourth SSDs 115 to 118 may distribute data of each of first to fourth SSDs 115 to 118 according to the WR into plurality of pieces of data corresponding to each of the command entries and having the calculated maximum payload size. Each of first to fourth SSDs 115 to 118 may transfer the plurality of pieces of data responsive to the WR of RNIC 112 to RNIC 112.

DMA read module 512 may read, with a DMA method, data of first to fourth SSDs 115 to 118 in the operational payload size (e.g., the calculated maximum payload size) of each of first to fourth SSDs 115 to 118 set by split payload module 514. Thereafter, each of first to fourth SSDs 115 to 118 may notify RNIC 112 of completion, that is that the plurality of pieces of data responsive to the WR of RNIC 112 have been transferred (CQ notify operation).

Packet generation module 516 may combine the plurality of pieces of data of each of first to fourth SSDs 115 to 118 to generate a data packet, according to the completion notification of first to fourth SSDs 115 to 118. Packet generation module 516 may provide the generated data packet to client (or host) 120 via network 130 (see FIG. 1).

The functions of DMA read module 512, split payload module 514, and packet generation module 516 in request manager 510 that cause RNIC 112 to operate at a maximum bandwidth may be controlled by software or may be hardware-automated, or in a combination of the two.

Figure 6:
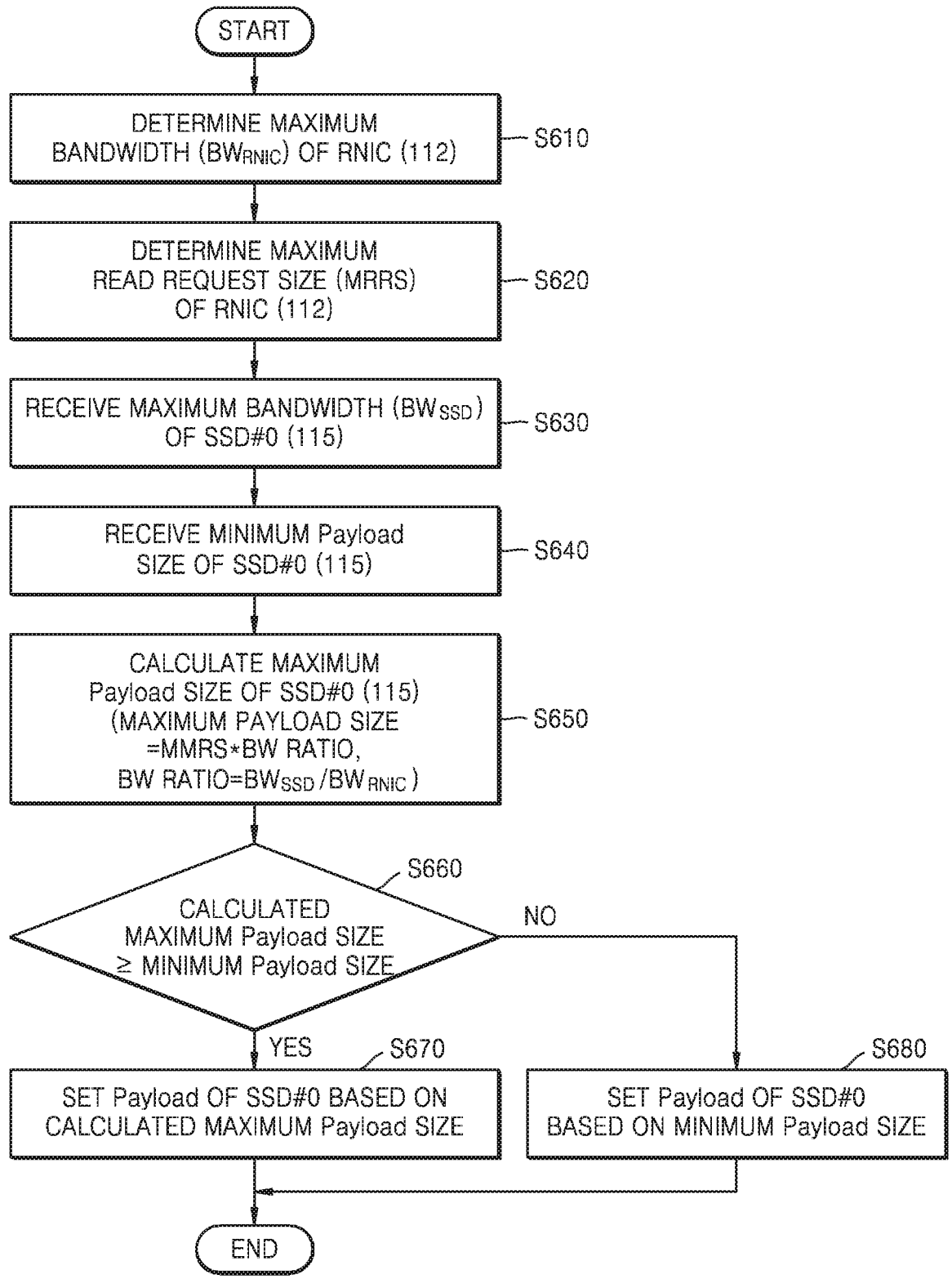
FIG. 6 is a flowchart illustrating an exemplary embodiment of an operation of a request manager of FIG. 5.

FIG. 6 is a flowchart illustrating an exemplary embodiment of an operation of the request manager of FIG. 5. A method of changing an operational payload size for first SSD 115 focused on RNIC 112 in FIG. 4 will be described with reference to FIG. 6.

Referring to FIG. 6, in Operation S610, request manager 510 may determine the maximum bandwidth ($BW_{RNIC}$) of RNIC 112. For example, the maximum bandwidth ($BW_{RNIC}$) of RNIC 112 may be 5 GB/s.

In Operation S620, request manager 510 may determine the MRRS of RNIC 112. For example, the MRRS of RNIC 112 may be 2 KB.

In Operation S630, request manager 510 may receive the maximum bandwidth ($BW_{SSD}$) of first SSD 115. For example, the maximum bandwidth ($BW_{SSD}$) of first SSD 115 may be 2.5 GB/s.

In Operation S640, request manager 510 may receive the minimum payload size of first SSD 115. For example, the minimum payload size of first SSD 115 may be 1 KB.

In Operation S650, request manager 510 may calculate the maximum payload size of first SSD 115. The calculated maximum payload size of first SSD 115 may be calculated by multiplying the MRRS of RNIC 112 by a bandwidth ratio BW RATIO. The bandwidth ratio BW RATIO may be determined by the ratio of the maximum bandwidth of first SSD 115 to the maximum bandwidth of RNIC 112.

For example, the bandwidth ratio BW RATIO is the ratio (i.e., 2.5/5=½) of the maximum bandwidth 2.5 GB/s of first SSD 115 to the maximum bandwidth 5 GB/s of RNIC 112. The calculated maximum payload size of first SSD 115 may be calculated as 1 KB by multiplying the MRRS (i.e., 2 KB) of RNIC 112 by the bandwidth ratio BW RATIO (i.e., ½).

Here, if the bandwidth ratio BW RATIO is less than 1, first SSD 115 is insufficient to achieve the maximum bandwidth performance of RNIC 112. In this case, it is necessary to connect another SSD (e.g., second SSD 116) in addition to first SSD 115 to RNIC 112 to perform DMA in parallel. On the other hand, if the bandwidth ratio BW RATIO is equal to or greater than 1, the bandwidth of first SSD 115 is sufficiently greater than the bandwidth of RNIC 112 and thus the maximum bandwidth performance of RNIC 112 may be achieved by only one SSD, i.e., first SSD 115.

In Operation S660, the request manager 510 may compare the calculated maximum payload size of first SSD 115 calculated in Operation S650 with the minimum payload size of first SSD 115. If the calculated maximum payload size of first SSD 115 is greater than or equal to the minimum payload size of first SSD 115, request manager 510 may set the operational payload size of first SSD 115 to the calculated maximum payload size (Operation S670). In Operation S670, since the calculated maximum payload size 1 KB of first SSD 115 is equal to the minimum payload size 1 KB of first SSD 115, the operational payload size of first SSD 115 may be set to the calculated maximum payload size 1 KB.

In Operation S660, if the calculated maximum payload size of first SSD 115 is less than the minimum payload size of first SSD 115, request manager 510 may set the operational payload size of first SSD 115 to the minimum payload size (Operation S680). As an example, it is assumed that the minimum payload size of first SSD 115 is 4 KB. Since the calculated maximum payload size 1 KB of first SSD 115 is less than the minimum payload size 4 KB, request manager 510 may set the operational payload size of first SSD 115 to the minimum payload size 4 KB.

In Operation S650 described above, a method, in which the bandwidth ratio BW RATIO is less than 1 and thus another SSD (e.g., second SSD 116) in addition to first SSD 115 is connected to RNIC 112 in order to achieve the maximum bandwidth performance of RNIC 112, has been proposed. A method, in which a new P2P device such as second SSD 116 is connected to RNIC 112 in order to achieve the maximum bandwidth performance of RNIC 112, is described with reference to FIG. 7.

Figure 7:
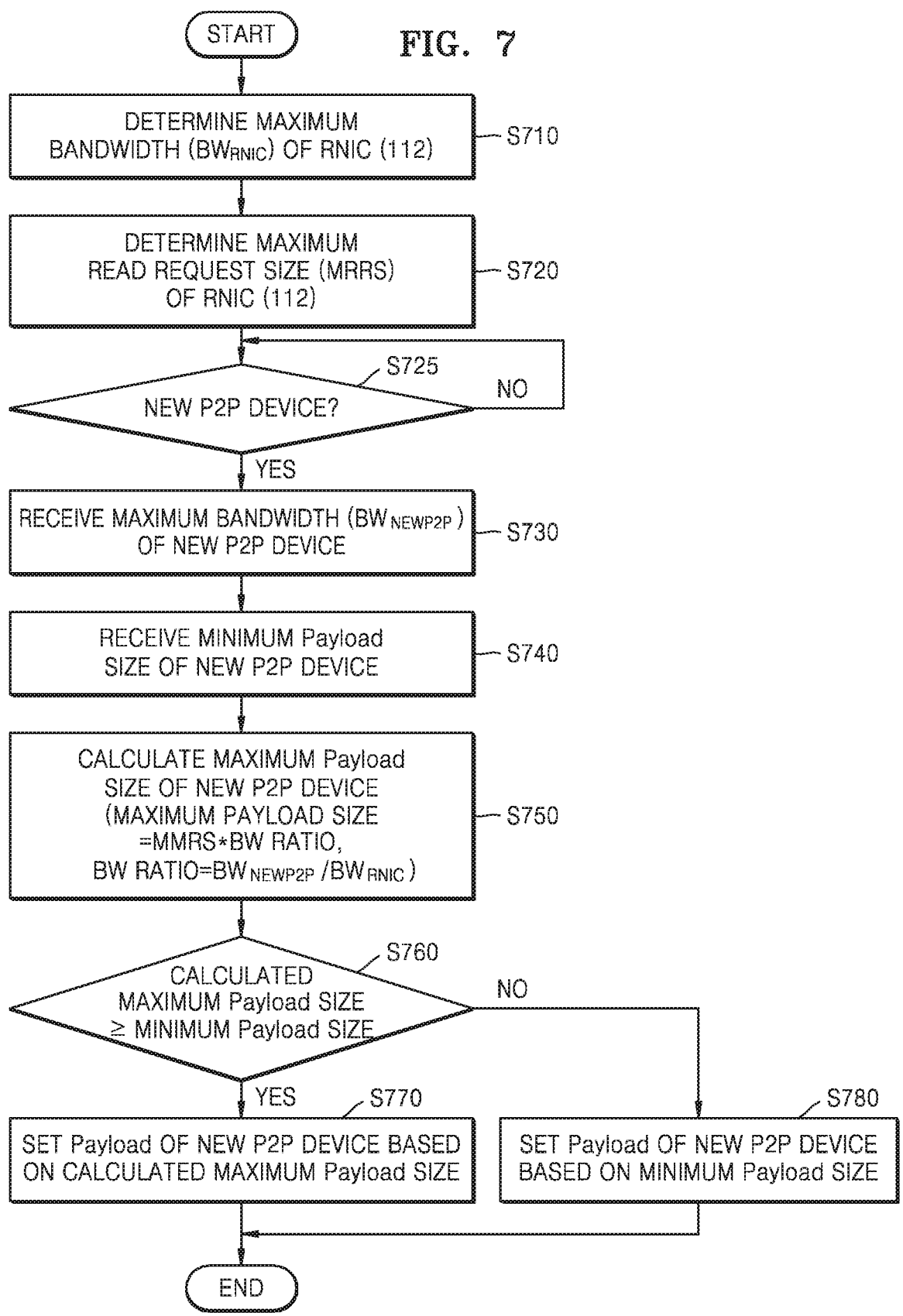
FIG. 7 is a flowchart illustrating another exemplary embodiment of an operation of a request manager in an RNIC of FIG. 5.

FIG. 7 is a flowchart illustrating another exemplary embodiment of an operation of the request manager of FIG. 5.

Referring to FIG. 7, in Operation S710, request manager 510 may determine the maximum bandwidth ($BW_{RNIC}$) of RNIC 112.

In Operation S720, request manager 510 may determine the MRRS of RNIC 112. For example, it is assumed that RNIC 112 has operation characteristics in which the maximum bandwidth ($BW_{RNIC}$) is 5 GB/s and the MRRS is 2 KB.

In Operation S725, request manager 510 may determine whether a new P2P device is connected to RNIC 112. In the discussion to follow, as an example it is assumed that the new P2P device is, for example, second SSD 116. If it is determined that second SSD 116 is connected to RNIC 112, Operation S730 is performed.

In Operation S730, request manager 510 may receive the maximum bandwidth ($BW_{NEWP2P}$) of second SSD 116. For example, the maximum bandwidth ($BW_{NEWP2P}$) of second SSD 116 may be 2.5 GB/s.

In Operation S740, request manager 510 may receive the minimum payload size of second SSD 116. For example, the minimum payload size of second SSD 116 may be 1 KB.

In Operation S750, request manager 510 may calculate the calculated maximum payload size of second SSD 116. The calculated maximum payload size of second SSD 116 may be calculated by multiplying the MRRS of RNIC 112 by a bandwidth ratio BW RATIO. The bandwidth ratio BW RATIO may be determined by the ratio of the maximum bandwidth of second SSD 116 to the maximum bandwidth of RNIC 112. For example, the bandwidth ratio BW RATIO is the ratio (i.e., ½) of the maximum bandwidth 2.5 GB/s of second SSD 116 to the maximum bandwidth 5 GB/s of RNIC 112. The calculated maximum payload size of second SSD 116 may be calculated as 1 KB by multiplying the MRRS (i.e., 2 KB) of RNIC 112 by the bandwidth ratio BW RATIO (i.e., ½).

In Operation S760, request manager 510 may compare the calculated maximum payload size of second SSD 116 calculated in Operation S750 with the minimum payload size of second SSD 116. If the calculated maximum payload size of second SSD 116 is greater than or equal to the minimum payload size of second SSD 116, request manager 510 may set the operational payload size of second SSD 116 to the calculated maximum payload size (Operation S770). In Operation S770, since the calculated maximum payload size 1 KB of second SSD 116 is equal to the minimum payload size 1 KB of second SSD 116, the operational payload size of second SSD 116 may be set to the calculated maximum payload size 1 KB.

In Operation S760, when the calculated maximum payload size of second SSD 116 is less than the minimum payload size of second SSD 116, request manager 510 may set the operational payload size of second SSD 116 to the minimum payload size (Operation S780).

In FIGS. 6 and 7, both first SSD 115 and second SSD 116 are the same type of SSDs having the same operating specifications, a maximum bandwidth of 2.5 GB/s, and a minimum payload size of 2 KB. Accordingly, RNIC 112 may set the maximum payload size of 1 KB, calculated equally for each of first SSD 115 and second SSD 116, to a corresponding operational payload size.

According to an embodiment, first and second SSDs 115 and 116 may be different types of SSDs having different operating specifications.

As an example, it is assumed that while first SSD 115 has a maximum bandwidth of 2.5 GB/s and a minimum payload size of 2 KB, second SSD 116 has a maximum bandwidth of 2.5 GB/s and a minimum payload size of 4 KB. In this case, RNIC 112 may calculate the calculated maximum payload size 1 KB of second SSD 116 by multiplying the MRRS (i.e., 2 KB) of RNIC 112 by the bandwidth ratio BW RATIO (i.e., ½) of RNIC 112. Since the minimum payload size of 4 KB of second SSD 116 is less than the calculated maximum payload size of 1 KB, RNIC 112 may set the minimum payload size of 4 KB to be the operational payload size of second SSD 116. Accordingly, RNIC 112 may set the operational payload size of first SSD 115 to the calculated maximum payload size of 1 KB and set the operational payload size of second SSD 116 to the minimum payload size of 4 KB.

Figure 8A:
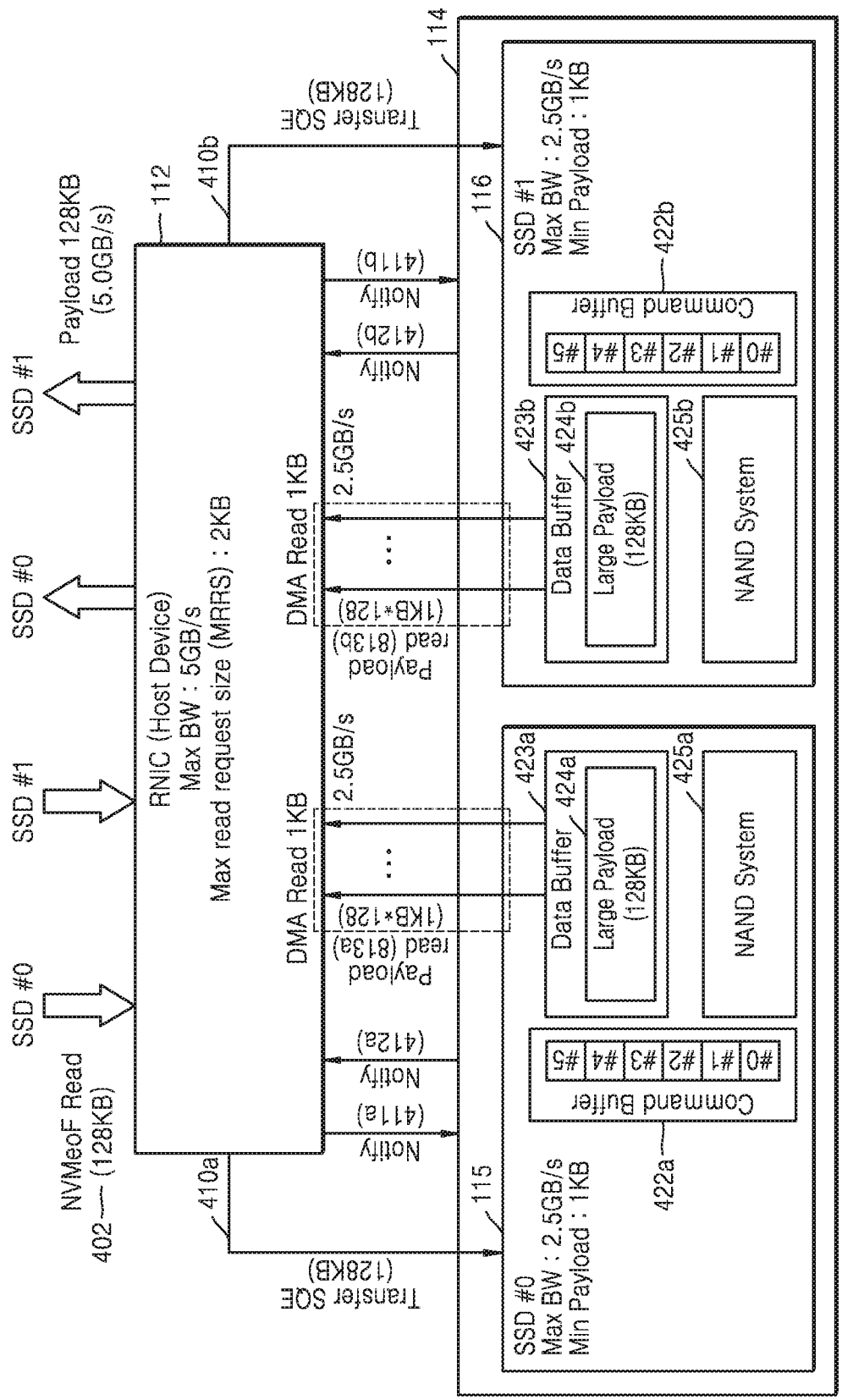
FIGS. 8A and 8B are diagrams illustrating data transfer according to RNIC operations of FIGS. 6 and 7.
Figure 8B:
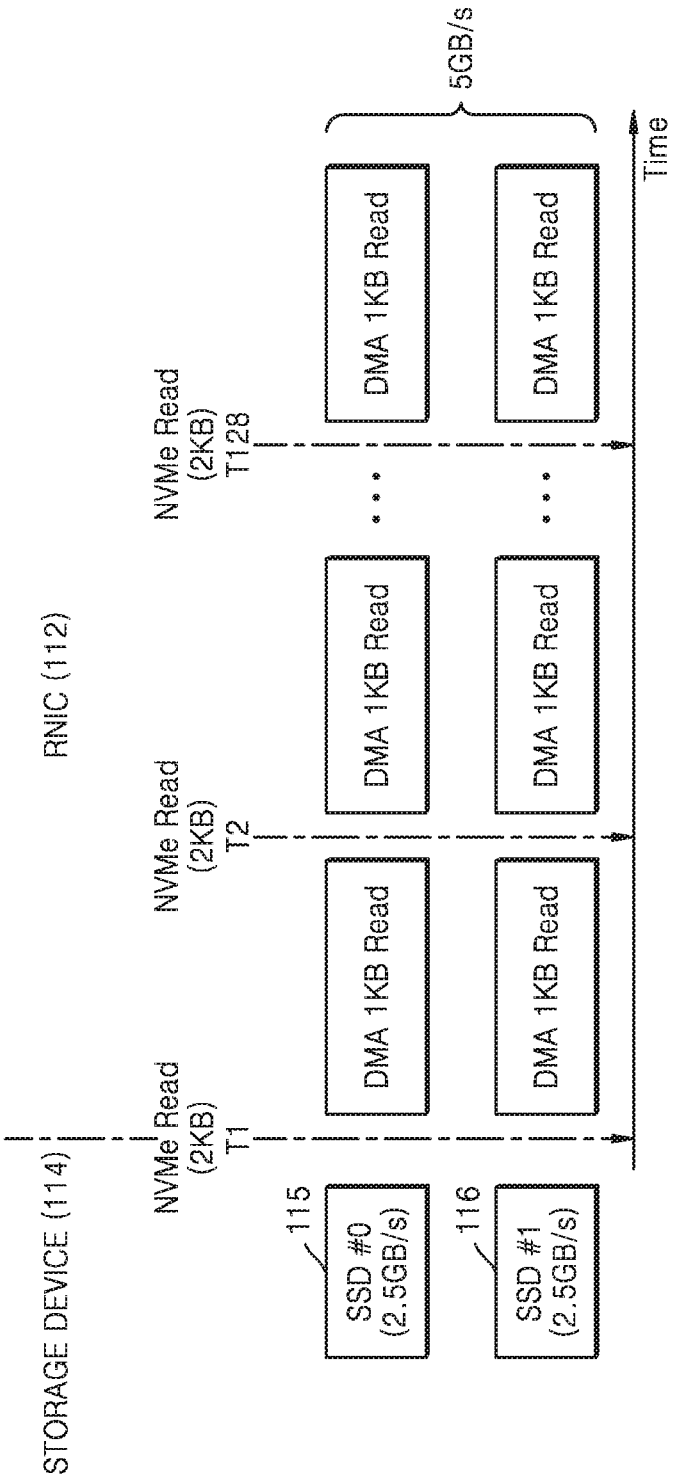

FIGS. 8A and 8B are diagrams illustrating data transfer according to RNIC operations of FIGS. 6 and 7. The data transfer illustrated in FIGS. 8A and 8B is compared with the data transfer illustrated in FIGS. 4A and 4B, and for convenience of explanation, differences from the data transfer illustrated in FIGS. 4A and 4B will be mainly described.

Referring to FIG. 8A, RNIC 112 may read data of data buffers 423a and 423b of first and second SSDs 115 and 116 (Operations 813a and 813b).

RNIC 112 may perform the operation of FIG. 6 to set the operational payload size of first SSD 115 to a calculated maximum payload size of 1 KB. RNIC 112 may perform the operation of FIG. 7 to set the operational payload size of second SSD 116 to the calculated maximum payload size of 1 KB.

RNIC 112 may perform DMA on a 128 KB payload 424a in data buffer 423a of first SSD 115 by the calculated maximum payload size of 1 KB (Operation 813a). At the same time, RNIC 112 may perform DMA on a 128 KB payload 424b in a data buffer 423b of second SSD 116 by the calculated maximum payload size of 1 KB (Operation 813b).

Referring to FIG. 8B, at time T1, RNIC 112 may read 1 KB data from each of first and second SSDs 115 and 116 by using DMA. At time T2, RNIC 112 may read 1 KB data from each of first and second SSDs 115 and 116 by using DMA. Then, at time T128, RNIC 112 may read 1 KB data from each of first and second SSDs 115 and 116 by using DMA. RNIC 112 reads 2 KB data from first and second SSDs 115 and 116 at DMA times T1 to T128.

The data transfer of FIGS. 8A and 8B may ensure scalability of NVMe-oF by connections of first and second SSDs 115 and 116. In addition, by limiting the operational payload size of first and second SSDs 115 and 116 to 1 KB, the MRRS of 2 KB of RNIC 112 may be satisfied and Quality of Service (QoS) of data transfer may be improved by maximizing the bandwidth of RNIC 112 to 5.0 GB/s. In addition, offloading in which first and second SSDs 115 and 116 operate independently according to an NVMe-oF protocol is possible.

Figure 9:
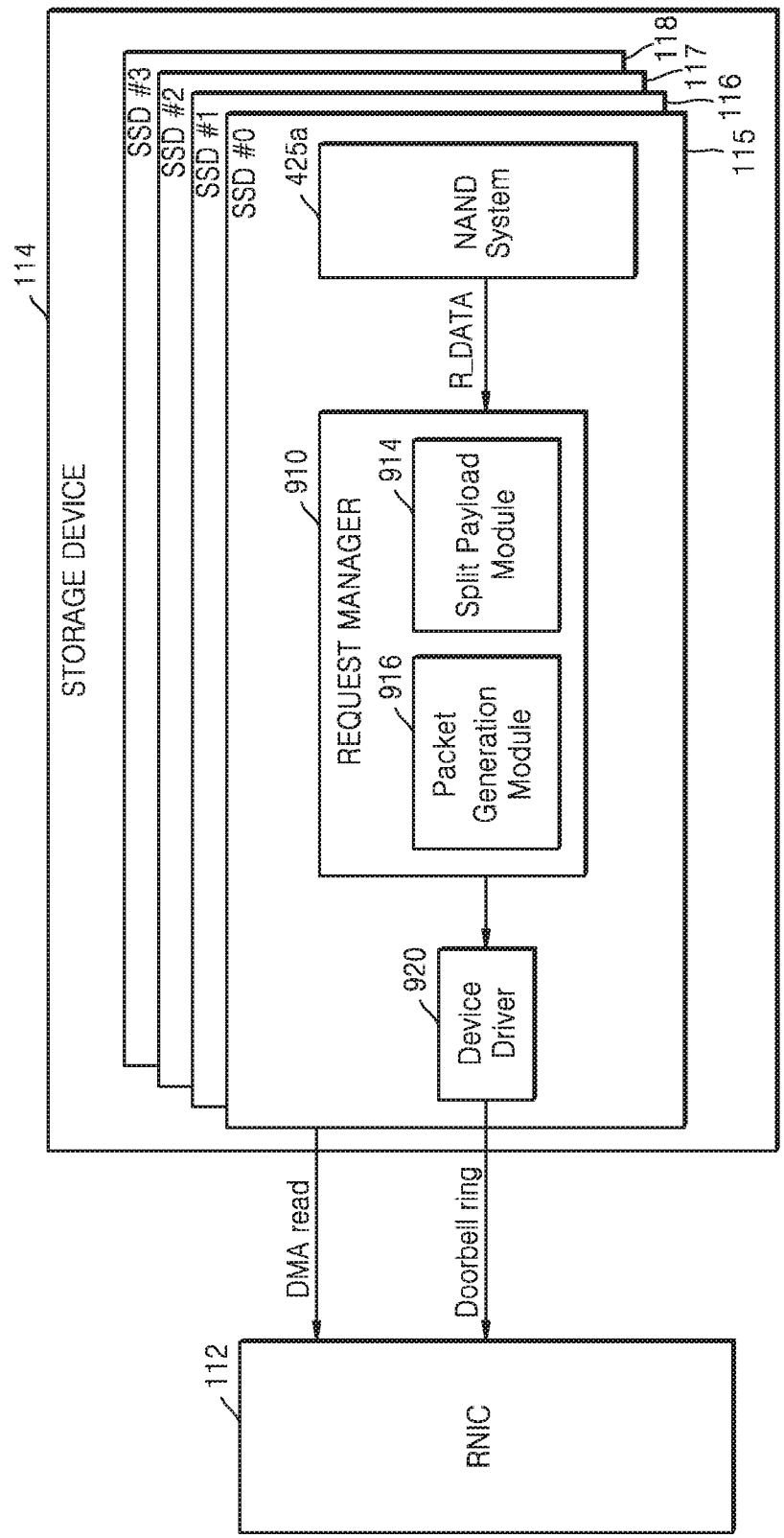
FIG. 9 is a diagram illustrating an exemplary embodiment of a storage device operating so that a bandwidth of a PCIe P2P connection has a maximum bandwidth.

FIG. 9 is a diagram illustrating an exemplary embodiment of a storage device 114 operating so that a bandwidth of a PCIe P2P connection has a maximum bandwidth. In FIG. 9, a part of the operation of request manager 510 in RNIC 112 described with reference to FIG. 5 is performed in storage device 114, and thus, a request manager 910 allows an RNIC 112 to operate at a maximum bandwidth. Request manager 910 will be described in detail with reference to FIG. 9.

Referring to FIG. 9, each of first to fourth SSDs 115 to 118 may include request manager 910. Request manager 910 of first SSD 115 among first to fourth SSDs 115 to 118 will be described in detail. The operation of request manager 910 of first SSD 115 may equally be applied to the request manager of second to fourth SSDs 116 to 118.

Request manager 910 may include a split payload module 914 and a packet generation module 916. Split payload module 914 may determine the maximum bandwidth ($BW_{RNIC}$) and MRRS of RNIC 112 and the maximum bandwidth ($BW_{SSD}$) and minimum payload size of first SSD 115.

Split payload module 914 may calculate a bandwidth ratio ($BW_{SSD}/BW_{RNIC}$) between the maximum bandwidth ($BW_{SSD}$) of first SSD 115 and the maximum bandwidth ($BW_{RNIC}$) of RNIC 112. Split payload module 914 may calculate the bandwidth ratio ($BW_{SSD}/BW_{RNIC}$) by performing an operation of dividing the maximum bandwidth ($BW_{SSD}$) of first SSD 115 by the maximum bandwidth ($BW_{RNIC}$) of RNIC 112.

Split payload module 914 may calculate a calculated maximum payload size of first SSD 115 by using the MRRS of RNIC 112 and the bandwidth ratio ($BW_{SSD}/BW_{RNIC}$) between the maximum bandwidth ($BW_{SSD}$) of first SSD 115 and the maximum bandwidth ($BW_{RNIC}$) of RNIC 112. Split payload module 914 may calculate the calculated maximum payload size of first SSD 115 by performing an operation of multiplying the MRRS of RNIC 112 by the bandwidth ratio ($BW_{SSD}/BW_{RNIC}$).

Split payload module 914 may compare the minimum payload size of first SSD 115 with the calculated maximum payload size. Split payload module 914 may set the operational payload size of first SSD 115 to the calculated maximum payload size when the calculated maximum payload size of first SSD 115 is equal to or greater than the minimum payload size.

Split payload module 914 may set the operational payload size of first SSD 115 to the minimum payload size when the calculated maximum payload size of first SSD 115 is less than the minimum payload size.

First SSD 115 may generate command entries according to a read WR of RNIC 112. Split payload module 914 may distribute data R_DATA read from a NAND system 425a according to the read WR into a plurality of pieces of data corresponding to each of the command entries and having the calculated maximum payload size.

Packet generation module 916 may combine the plurality of pieces of data obtained by the distributing by split payload module 914 to generate a data packet. Packet generation module 916 may provide the data packet to RNIC 112 via a device driver 920. Device driver 920 may notify RNIC 112 with a doorbell ring operation each time RNIC 112 reads the data packet of first SSD 115. Device driver 920 may notify RNIC 112 with a doorbell ring operation each time RNIC 112 reads, with a DMA method, the data packet of first SSD 115.

The functions of request manager 910 of first SSD 115 may be controlled by software or may be hardware-automated or may be a combination of the two. Similarly, the functions of the request managers of second to fourth SSDs 116 to 118 may be controlled by software or hardware-automated or may be a combination of the two. RNIC 112 may transfer data to first to fourth SSDs 115 to 118, with a maximum bandwidth, by the operation of the request manager of each of first to fourth SSDs 115 to 118.

The operating methods of the request managers 510 and 910 described with reference to FIGS. 5 to 9 may be implemented using program codes permanently stored on any of non-writable storage media such as ROM devices, changeable program codes stored on any of non-transitory recordable storage media as a floppy disk, a magnetic tape, CDs, RAM devices, and/or other magnetic and optical media, or program codes transferred to a computer via communication media as in an electronic network such as the Internet or telephone modem lines.

According to an embodiment, the operating methods of request managers 510 and 910 may be provided as a computer program product implemented as a set of instructions encoded for execution in a software executable object or for execution by a processor that is responsive to the instructions.

According to an embodiment, the operating methods of request managers 510 and 910 may be implemented wholly or in part by using application specific integrated circuits (ASICs), field programmable gate arrays (FPGAs), state machines, controllers, other hardware components such as devices, or combinations of hardware, software, and firmware.

Figure 10A:
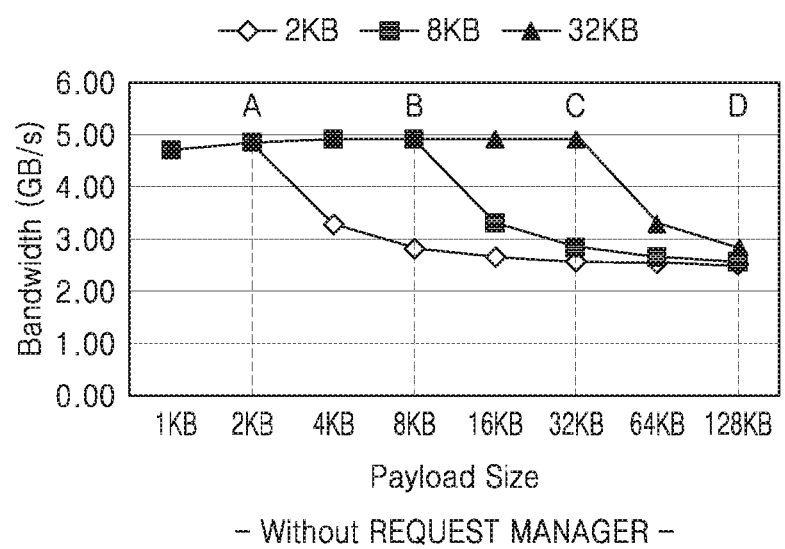
FIGS. 10A and 10B are graphs illustrating the performance of exemplary embodiments of an RNIC according to the operations of request managers.
Figure 10B:
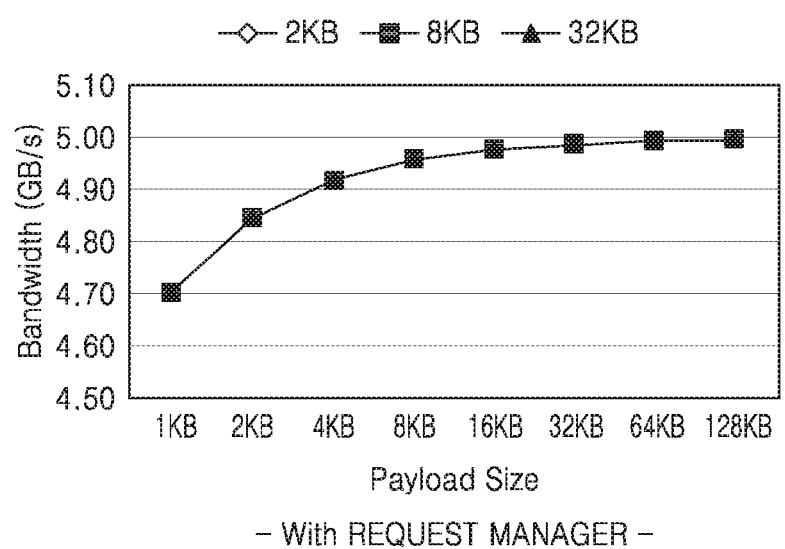

FIGS. 10A and 10B are graphs illustrating the performance of exemplary embodiments of an RNIC according to the operations of request managers. FIG. 10A shows the performance of the RNIC when a request manager is not executed, and FIG. 10B shows the performance of the RNIC when the request manager of FIGS. 5 to 9 is executed. The horizontal axis of each of the graphs of FIGS. 10A and 10B indicates an operational payload size, and the vertical axis of each of the graphs indicates the maximum bandwidth of the RNIC. In FIGS. 10A and 10B, the maximum bandwidth of the RNIC (i.e., RNIC 112 in FIGS. 4A and 8A) is 5.0 GB/s and the maximum bandwidth of first and second SSDs (i.e., first and second SSDs 115 and 116 in FIGS. 4A and 8A) is 2.5 GB/s, and the performance of the RNIC is shown with respect to each of when the MRRS of the RNIC is 2 KB, when the MRRS of the RNIC is 8 KB, and when the MRRS of the RNIC is 32 KB.

Referring to FIGS. 4A and 10A, when the MRRS is 2 KB, the RNIC exhibits a maximum bandwidth of 5.0 GB/s up to an area (area A) where the operational payload size is less than the MRRS of 2 KB. However, the bandwidth of the RNIC is reduced to about 2.5 GB/s in areas (areas B, C, and D) where the operational payload size is greater than the MRRS of 2 KB.

When the MRRS is 8 KB, the RNIC exhibits a maximum bandwidth of 5.0 GB/s up to an area (area B) where the operational payload size is less than the MRRS of 8 KB. However, the bandwidth of the RNIC is reduced to about 2.5 GB/s in areas (areas C and D) where the operational payload size is greater than the MRRS of 8 KB.

When the MRRS is 32 KB, the RNIC exhibits a maximum bandwidth of 5.0 GB/s up to an area (area C) where the operational payload size is less than the MRRS of 32 KB. However, the bandwidth of the RNIC is reduced to about 2.5 GB/s in an area (area D) where the operational payload size is greater than the MRRS of 32 KB.

FIG. 10A shows that when the operational payload size of first and second SSDs 115 and 116 is greater than the MRRS of RNIC 112, RNIC 112 is focused on one SSD (e.g., first SSD 115) and thus the maximum bandwidth performance of RNIC 112 is limited to the 2.5 Gb/s bandwidth of first SSD 115. To solve this problem, the operational payload size of for data transfers involving first and second SSDs 115 and 116 may be changed using the request manager of FIGS. 5 to 9.

Referring to FIGS. 8A and 10B, the maximum bandwidth of RNIC 112 is 5.0 Gb/s for each of the MRRSs of 2 KB, 8 KB, and 32 KB. A bandwidth ratio (2.5/5=½) between each of first and second SSDs 115 and 118 and RNIC 112 is multiplied by the MRRSs of 2 KB, 8 KB, and 32 KB and thus maximum payload sizes of 1 KB, 4 KB, and 16 KB are calculated, and the operational payload size of for data transfers involving first and second SSDs 115 and 116 is set to the calculated maximum payload sizes of 1 KB, 4 KB, and 16 KB and thus the maximum bandwidth performance of the RNIC is maintained.

Figure 11:
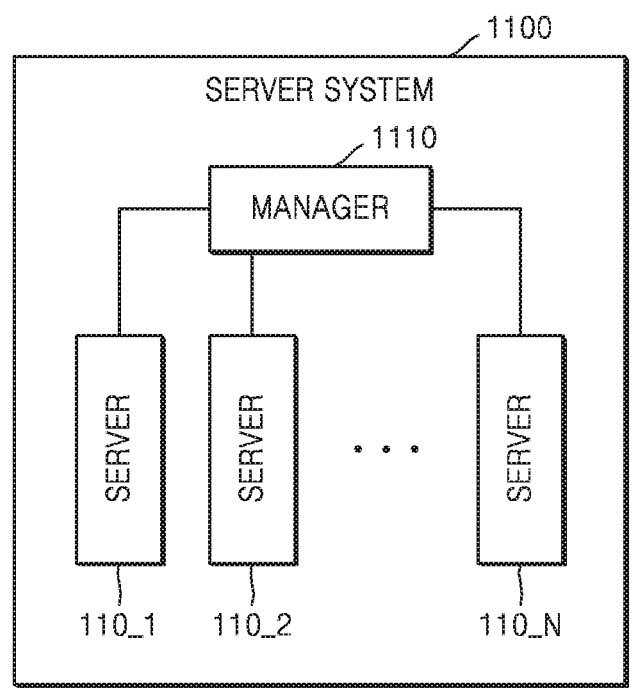
FIG. 11 is a block diagram of an exemplary embodiment of a server system.

FIG. 11 is a block diagram of an embodiment of a server system 1100.

Referring to FIG. 11, server system 1100 may include a plurality of servers 110_1, 110_2, . . . , and 110_N. The plurality of servers 110_1, 110_2, . . . , and 110_N may be connected to a manager 1110. The plurality of servers 110_1, 110_2, . . . , and 110_N may be the same as or similar to server 110 described above. Each of the plurality of servers 110_1, 110_2, . . . , and 110_N may include RNIC 112 and storage device 114 including the plurality of storage elements 115 to 118, described above. RNIC 112 may DMA-access the plurality of storage elements 115 to 118, connected to each other via a PCIe bus, with the maximum bandwidth of RNIC 112.

Figure 12:
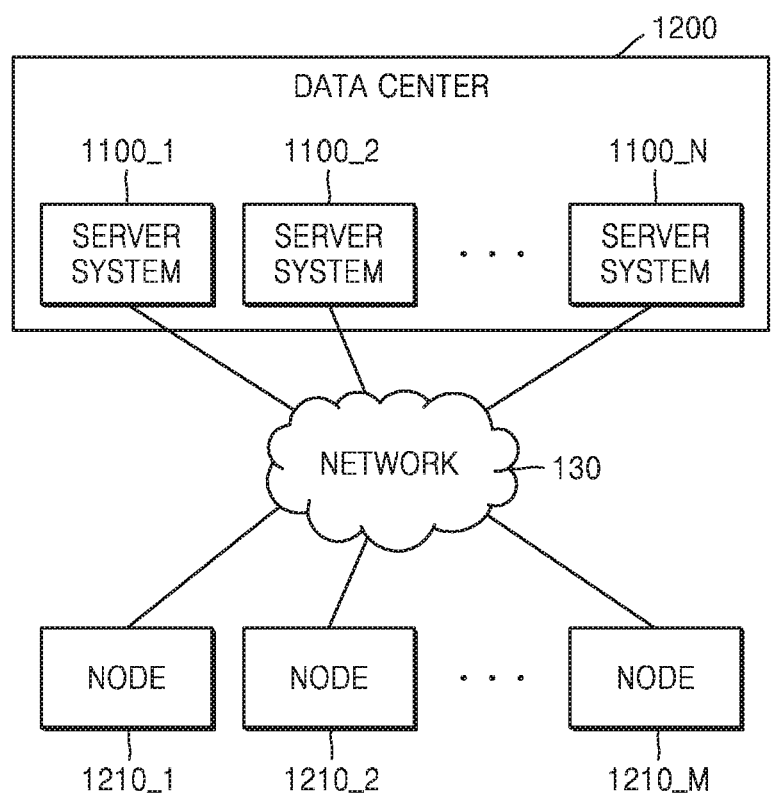
FIG. 12 is a block diagram illustrating an exemplary embodiment of a data center.

FIG. 12 is a block diagram illustrating an exemplary embodiment of a data center 1200.

Referring to FIG. 12, data center 1200 may include a plurality of server systems 1100_1, 1100_2, . . . , and 1100_N. Each of the plurality of server systems 1100_1, 1100_2, . . . , and 1100_N may be similar to or the same as server system 1100 shown in FIG. 11 and described above. The plurality of server systems 1100_1, 1100_2, . . . , and 1100_N may communicate with various nodes 1210_1, 1210_2, . . . , and 1210_M through a network 130 such as the Internet. For example, nodes 1210_1, 1210_2, . . . , and 1210_M may be any of client computers, other servers, remote data centers, and storage systems.

While the inventive concept has been particularly shown and described with reference to embodiments thereof, it will be understood that various changes in form and details may be made therein without departing from the spirit and scope of the following claims.

What is claimed is:

1. A method, comprising:
a request manager disposed within an electronic device determining a maximum bandwidth and a maximum read request size of a first device among Peripheral Component Interconnect Express (PCIe) peer-to-peer (P2P) connected devices;
the request manager determining a maximum bandwidth of a second device among the PCIe P2P connected devices;
the request manager calculating a calculated maximum payload size of the second device, based on the maximum read request size of the first device, the maximum bandwidth of the first device, and the maximum bandwidth of the second device; and
the request manager setting an operational payload size of the second device for data transfers involving the second device, based on the calculated maximum payload size.

2. The method of claim 1, wherein the calculating of the calculated maximum payload size of the second device comprises the request manager:
calculating a first bandwidth ratio by dividing the maximum bandwidth of the second device by the maximum bandwidth of the first device; and
calculating the calculated maximum payload size of the second device by multiplying the maximum read request size of the first device by the first bandwidth ratio.

3. The method of claim 1, further comprising the request manager:
comparing a minimum payload size of the second device with the calculated maximum payload size of the second device,
wherein the setting of the operational payload size of the second device comprises:
when the calculated maximum payload size of the second device is greater than or equal to the minimum payload size of the second device as a result of the comparing, setting the operational payload size of the second device to the calculated maximum payload size of the second device.

4. The method of claim 3, wherein the setting of the operational payload size of the second device comprises:
when the calculated maximum payload size is less than the minimum payload size of the second device, the request manager setting the operational payload size of the second device to the minimum payload size.

5. The method of claim 1, further comprising:
generating command entries in the second device according to a work request of the first device; and
distributing data of the second device read according to the work request into a plurality of pieces of data having the calculated maximum payload size so as to correspond to each of the command entries.

6. The method of claim 5, further comprising:
combining, by the second device, the plurality of pieces of data obtained by distributing the data according to the command entries, thereby generating a data packet;
transferring, by the second device, the data packet to the first device.

7. The method of claim 5, further comprising:
transferring, by the second device, the plurality of pieces of data obtained by distributing the data according to the command entries to the first device and notifying the first device about completion of the transferring;
combining, by the first device, the plurality of pieces of data, thereby generating a data packet.

8. The method of claim 1, wherein the request manager is disposed in the first device.

9. The method of claim 1, wherein the request manager is disposed in the second device.

10. A data processing system, comprising:
an interface device configured to respond to requests issued by a host; and
a storage device comprising a plurality of storage elements accessible by the host, wherein each of the storage elements is a Peripheral Component Interconnect Express (PCIe) peer-to-peer (P2P) connected storage element,
wherein the interface device or at least one of the plurality of PCIe P2P connected storage elements includes a request manager which is configured to:
determine a maximum bandwidth and a maximum read request size of the interface device, and determine a maximum bandwidth of the at least one PCIe P2P connected storage element,
calculate a calculated maximum payload size of the at least one PCIe P2P connected storage element based on the maximum read request size of the interface device, the maximum bandwidth of the interface device, and the maximum bandwidth of the at least one PCIe P2P connected storage element, and
set an operational payload size of the at least one PCIe P2P connected storage element for data transfers involving the at least one PCIe P2P connected storage element based on the calculated maximum payload size.

11. The data processing system of claim 10, wherein the request manager is configured to calculate a bandwidth ratio by dividing the maximum bandwidth of the at least one PCIe P2P connected storage element by the maximum bandwidth of the interface device, and to calculate the calculated maximum payload size of the at least one PCIe P2P connected storage element by multiplying the maximum read request size of the interface device by the bandwidth ratio.

12. The data processing system of claim 10, wherein the request manager is configured to compare a minimum payload size of the at least one PCIe P2P connected storage element with the calculated maximum payload size of the at least one PCIe P2P connected storage element, to set the operational payload size of the at least one PCIe P2P connected storage element to the calculated maximum payload size when the calculated maximum payload size of the storage element is greater than or equal to the minimum payload size of the at least one PCIe P2P connected storage element, and to set the operational payload size of the at least one PCIe P2P connected storage element to the minimum payload size when the calculated maximum payload size of the at least one PCIe P2P connected storage element is less than the minimum payload size of the at least one PCIe P2P connected storage element.

13. The data processing system of claim 10, wherein the interface device is configured to divide command entries of each of the plurality of PCIe P2P connected storage elements to distribute data of each of the plurality of the PCIe P2P connected storage elements into a plurality of pieces of data having the calculated maximum payload size of the PCIe P2P connected storage element.

14. The data processing system of claim 13, wherein each of the PCIe P2P connected plurality of storage elements is configured to combine the plurality of pieces of data obtained by distributing the data according to the divided command entries to generate a data packet, and transfer the data packet to the interface device.

15. The data processing system of claim 13, wherein each of the plurality of PCIe P2P connected storage elements is configured to transfer the plurality of pieces of data obtained by distributing the data according to the command entries to the interface device and to notify the interface device about transfer completion.

16. The data processing system of claim 15, wherein the interface device is configured to combine the plurality of pieces of data received from each of the plurality of PCIe P2P connected storage elements and generate a data packet, and transfer the data packet to the host.

17. A system, comprising:
a first Peripheral Component Interconnect Express (PCIe) peer-to-peer (P2P) connected device, and a second PCIe P2P connected device, wherein the first PCIe P2P connected device and the second PCIe P2P connected device are connected to each other,
wherein one of the first PCIe P2P connected device and the second PCIe P2P connected device includes a request manager which is configured to:
determine a maximum bandwidth and a maximum read request size of the first PCIe P2P connected device;
determine a maximum bandwidth of the second PCIe P2P connected device;
determine a calculated maximum payload size of the second PCIe P2P connected device, based on the maximum read request size of the first PCIe P2P connected device, the maximum bandwidth of the first PCIe P2P connected device, and the maximum bandwidth of the second PCIe P2P connected device;
compare a minimum payload size of the second PCIe P2P connected device with the calculated maximum payload size of the second PCIe P2P connected device; and
set an operational payload size of the second PCIe P2P connected device for data transfers involving the second PCIe P2P connected device based on a result of the comparison,
wherein the request manager is further configured such that when the calculated maximum payload size of the second PCIe P2P connected device is greater than or equal to the minimum payload size of the second PCIe P2P connected device, the request manager sets the operational payload size of the second device to the calculated maximum payload size of the second device, and when the calculated maximum payload size of the second PCIe P2P connected device is less than the minimum payload size of the second PCIe P2P connected device, the request manager sets the operational payload size of the second device to the minimum payload size of the second PCIe P2P connected device.

18. The system of claim 17, wherein the first PCIe P2P connected device is a Remote Direct Memory Access (RDMA)-enabled Network Interface Controller (RNIC), the second PCIe P2P connected device is a storage device, and the RNIC comprises the request manager.

19. The system of claim 17, wherein the first PCIe P2P connected device is a Remote Direct Memory Access (RDMA)-enabled Network Interface Controller (RNIC), the second PCIe P2P connected device is a storage device, and the storage device comprises the request manager.

20. The system of claim 19, wherein the storage device further comprises:
a memory;
a device driver; and
a packet generator,
wherein the storage device is configured to generate command entries according to a read work request of the RNIC, wherein the request manager is configured to distribute data read from the memory according to the read work request into a plurality of pieces of data corresponding to each of the command entries and having the operational payload size, wherein the packet generator is configured to combine the plurality of pieces of data obtained by the distributing by the request manager to generate a data packet, and wherein the device driver is configured to provide the data packet to the RNIC.

* * * * *